United States Patent Office.

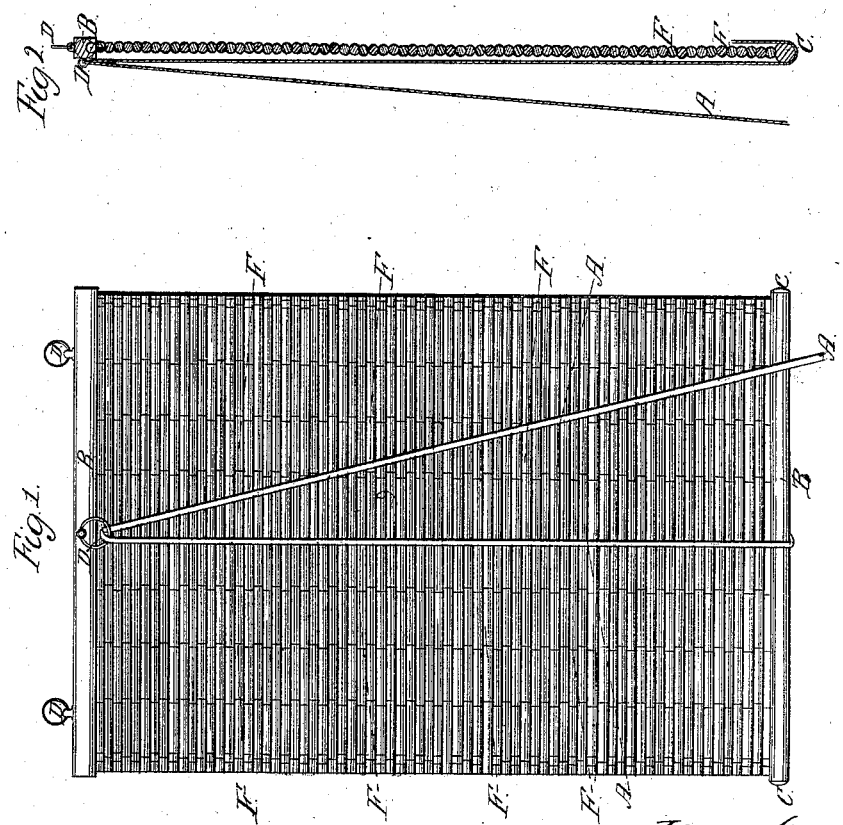

ADOLPH BINNER, OF MUSCATINE, IOWA, ASSIGNOR TO HIMSELF AND JOHN LEUZINGER, OF SAME PLACE

Letters Patent No. 64,062, dated April 23, 1867.

IMPROVED WINDOW-SHADE.

*The Schedule referred to in these Letters Patent and making part of the same.*

TO ALL WHOM IT MAY CONCERN:

Be it known that I, ADOLPH BINNER, of Muscatine, in the county of Muscatine, and State of Iowa, have invented a new and useful improvement in Window-Shades; and I do hereby declare the following to be a full, clear, and exact description of the same, reference being had to the accompanying drawings, which are made part of this specification, and in which—

Figure 1 is a front elevation of a window-shade embodying my invention.

Figure 2 is a side or edge view of the same.

Similar letters of reference indicate the same parts in the two figures.

My invention consists in the employment of round sticks as sections of a window-shade, blind, curtain, or screen, instead of flat strips or slats, converging to edges, as heretofore practised; and the chief advantage which results from my said invention is that the round slats are not liable to cut or quickly wear out the cords whereby they are connected together, which is the case when the slats consist of edged flat strips, or pieces having any other than a round shape.

In order that others skilled in the art to which my invention appertains may be enabled to fully understand and use the same, I will proceed to describe it in connection with the accompanying drawings.

F represents the round sticks of which the curtain, shade, screen, or blind is composed; E, the cord or twine for holding the sections or sticks of the curtain together; B B, the end pieces; and A, the elevating cord, which may run through one of the rings D, upon which the curtain is suspended. Any number of threads or cords may be employed for connecting the round sticks, and such threads may be applied by means of a loom or otherwise.

I am aware that a patent was granted December 12, 1865, to Ward and Wilson for a window-shade operating on the same general principle as mine, but composed of elliptical slats converging to edges. This, therefore, I do not claim. My shade is composed of round sticks having no edges, and is thereby adapted to roll with greater ease and uniformity, and entirely avoids any angles to wear the connecting cords.

Having thus described my invention, the following is what I claim as new, and desire to secure by Letters Patent:

I claim a window-curtain or shade, composed of round sticks of wood connected together, substantially as described.

To the above specification of my improvement in window-shades I have signed my hand this 23d day of November, A. D. 1866.

ADOLPH BINNER.

Witnesses:
THOMAS HANNA,
G. HANNA.